US011038954B2

(12) United States Patent
Cochran et al.

(10) Patent No.: US 11,038,954 B2
(45) Date of Patent: Jun. 15, 2021

(54) SECURE PUBLIC CONNECTIVITY TO VIRTUAL MACHINES OF A CLOUD COMPUTING ENVIRONMENT

(71) Applicant: Verizon Patent and Licensing Inc., Basking Ridge, NJ (US)

(72) Inventors: Marc J. Cochran, Shrewsbury, MA (US); Paul M. Curtis, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1045 days.

(21) Appl. No.: 14/030,093

(22) Filed: Sep. 18, 2013

(65) Prior Publication Data
US 2015/0081909 A1    Mar. 19, 2015

(51) Int. Cl.
*H04L 29/08* (2006.01)
*H04L 29/06* (2006.01)
*G06F 9/455* (2018.01)

(52) U.S. Cl.
CPC ...... *H04L 67/1023* (2013.01); *G06F 9/45558* (2013.01); *H04L 63/104* (2013.01); *G06F 2009/45587* (2013.01)

(58) Field of Classification Search
CPC .... H04L 67/1023; H04L 29/12; H04L 63/104
USPC .......................................................... 709/226
See application file for complete search history.

(56) References Cited

U.S. PATENT DOCUMENTS

| 6,445,704 | B1* | 9/2002 | Howes | H01R 31/005 |
| | | | | 370/392 |
| 8,370,530 | B2* | 2/2013 | Tripathi | G06F 9/45558 |
| | | | | 709/218 |
| 8,650,299 | B1* | 2/2014 | Huang | H04L 67/1002 |
| | | | | 709/226 |
| 2009/0198800 | A1* | 8/2009 | Dighe | G06F 15/177 |
| | | | | 709/221 |
| 2009/0288084 | A1* | 11/2009 | Astete | G06F 9/45533 |
| | | | | 718/1 |
| 2009/0300608 | A1* | 12/2009 | Ferris | G06F 9/45558 |
| | | | | 718/1 |
| 2011/0110377 | A1* | 5/2011 | Alkhatib | H04L 29/12349 |
| | | | | 370/395.53 |
| 2011/0214176 | A1* | 9/2011 | Burch | G06F 9/455 |
| | | | | 726/15 |

(Continued)

OTHER PUBLICATIONS

"Virtual Routing and Forwarding," from Wikipedia, the free encyclopedia, en.wikipedia.org/wiki/Virtual_Routing_and_Forwarding, May 30, 2013 (print date), 2 pages.

*Primary Examiner* — Lance Leonard Barry
*Assistant Examiner* — Timothy Sowa

(57) ABSTRACT

A network device, of a cloud computing environment, receives a packet destined for a virtual machine of the cloud computing environment. The packet is received from a user device and via public network. The network device is associated with a first public Internet protocol (IP) address, and the virtual machine is associated with a second public IP address that is different than the first public IP address. The network device determines, based on the packet, the second public IP address associated with the virtual machine, and provides the packet to the virtual machine based on the second public IP address associated with the virtual machine.

20 Claims, 14 Drawing Sheets

(56) References Cited

U.S. PATENT DOCUMENTS

| | | | |
|---|---|---|---|
| 2011/0314469 A1* | 12/2011 | Qian | H04L 49/9057 718/1 |
| 2012/0185914 A1* | 7/2012 | Delco | G06F 9/45558 726/1 |
| 2012/0233668 A1* | 9/2012 | Leafe | G06F 9/5022 726/4 |
| 2013/0031233 A1* | 1/2013 | Feng | G06F 9/06 709/223 |
| 2013/0205028 A1* | 8/2013 | Crockett | G06F 9/5027 709/226 |
| 2014/0082048 A1* | 3/2014 | Khalidi | H04L 67/1097 709/203 |
| 2014/0244851 A1* | 8/2014 | Lee | H04L 45/00 709/228 |

* cited by examiner

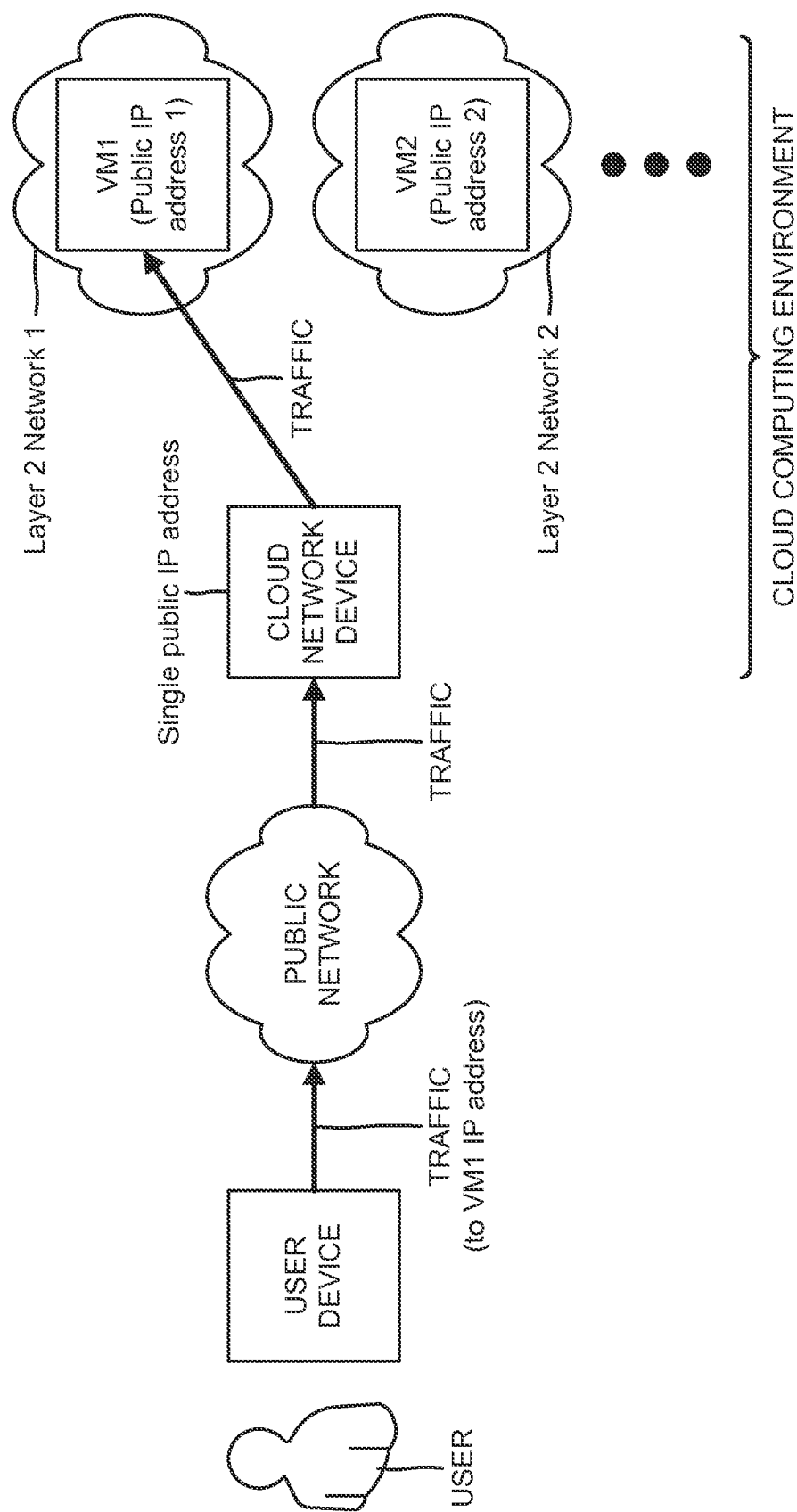

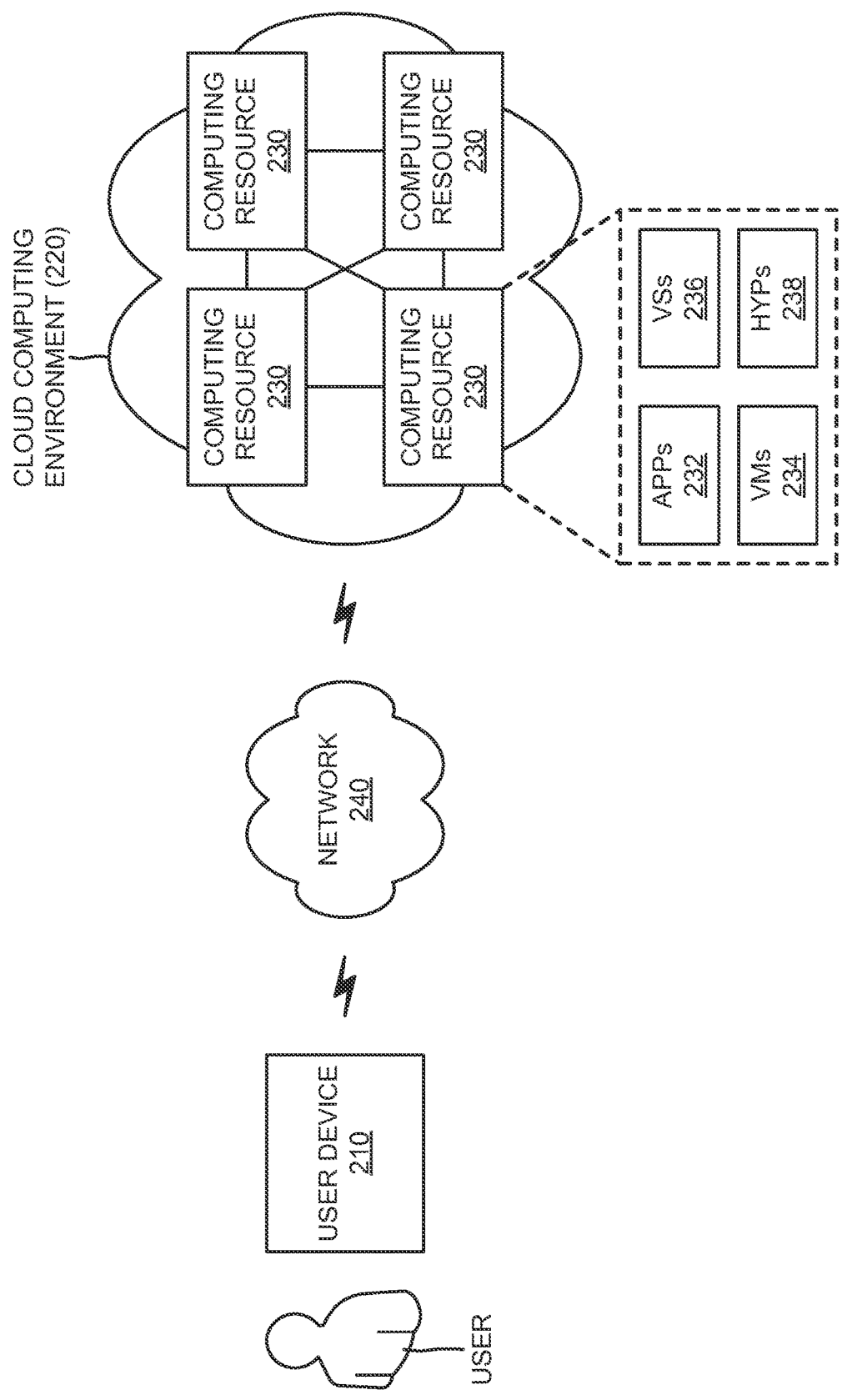

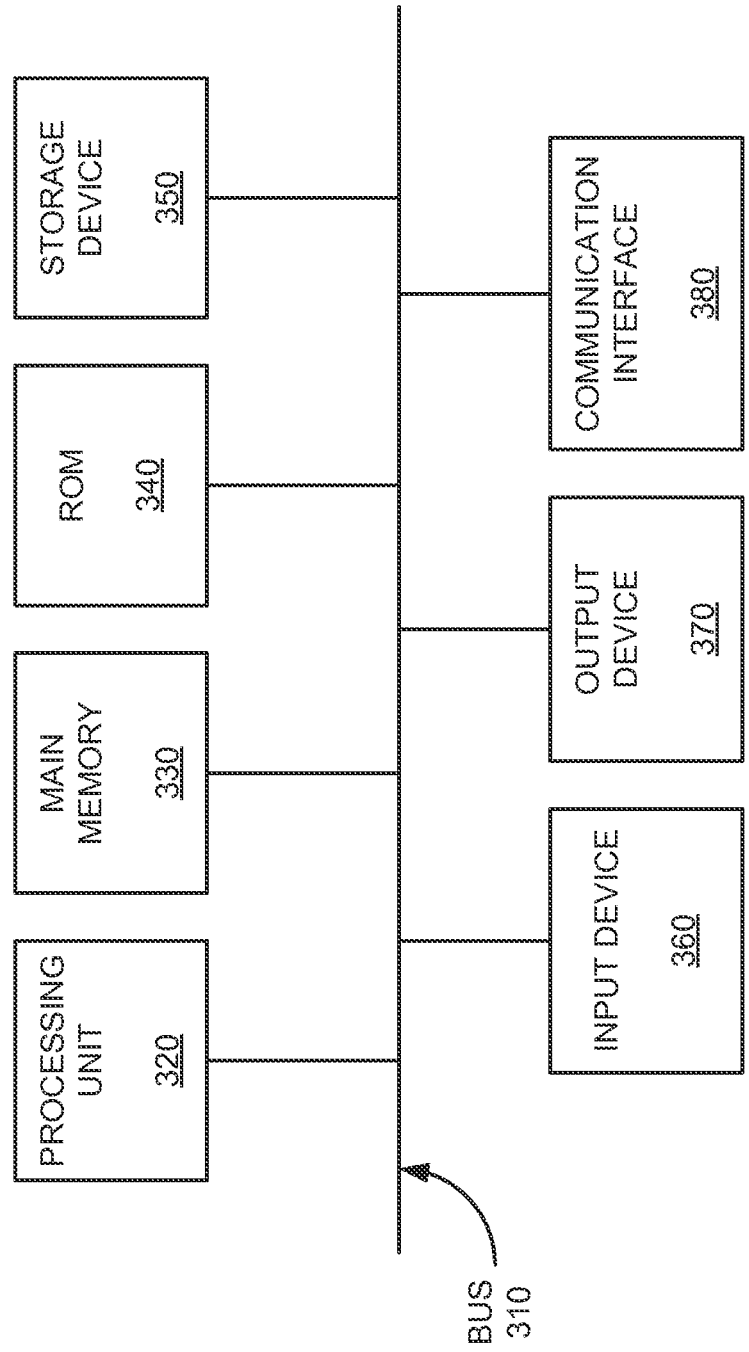

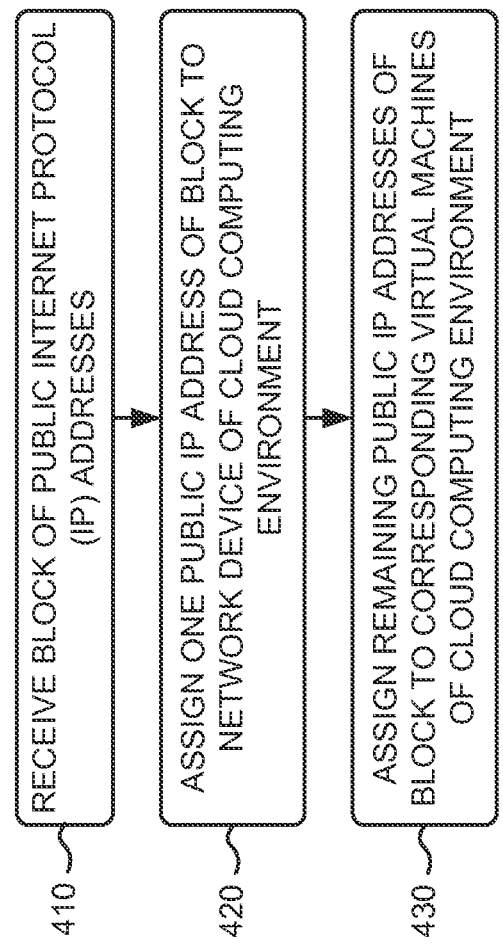

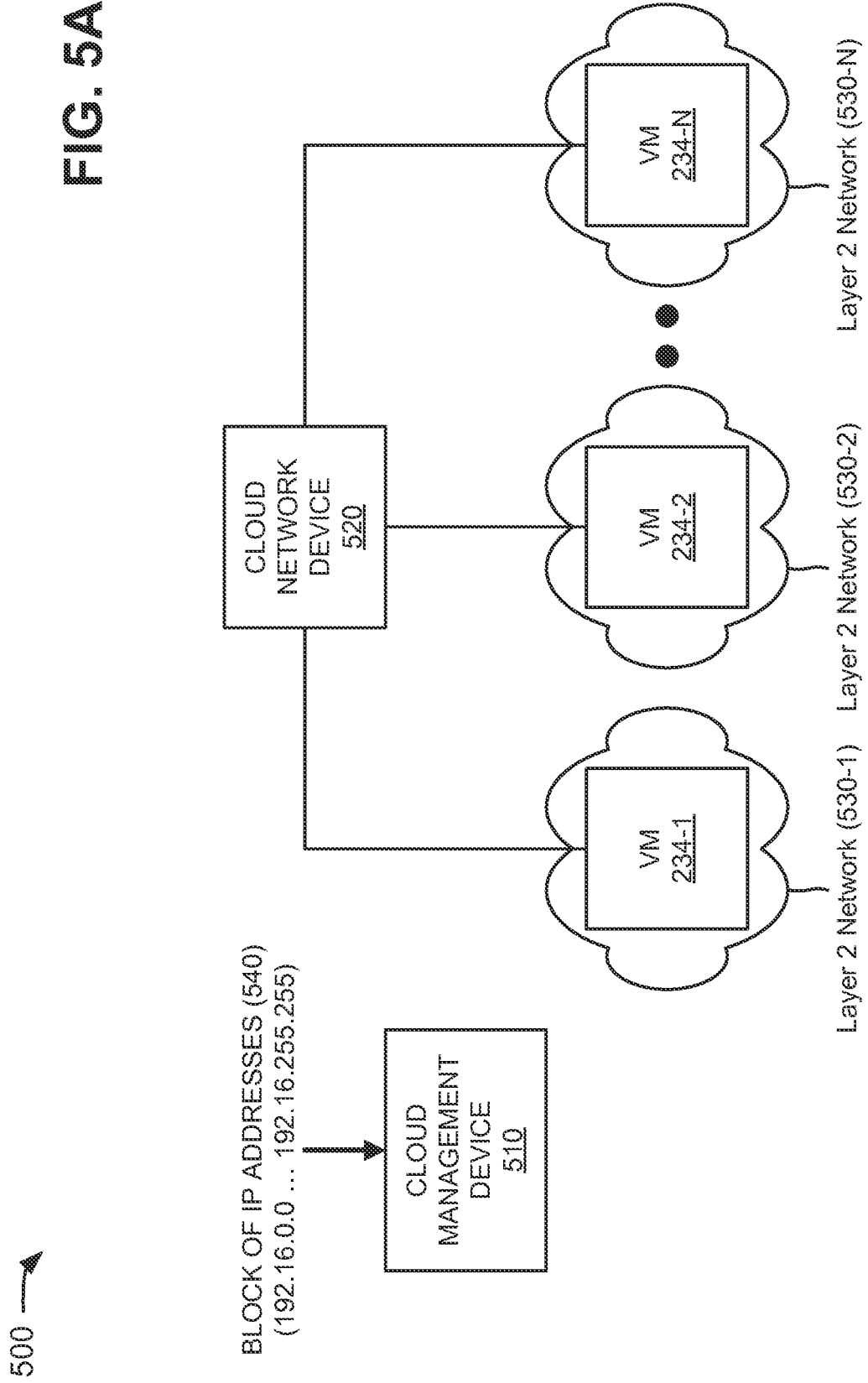

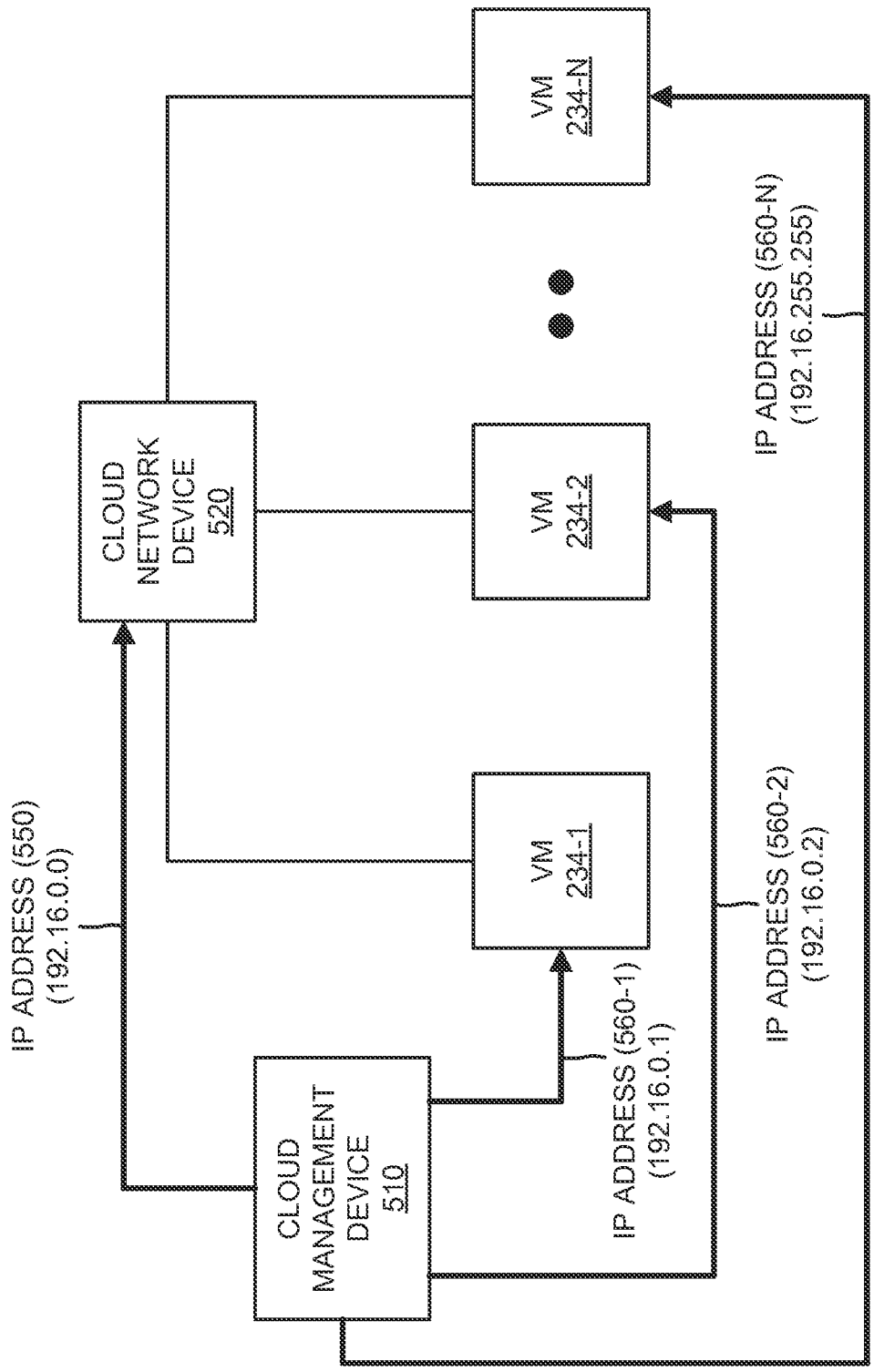

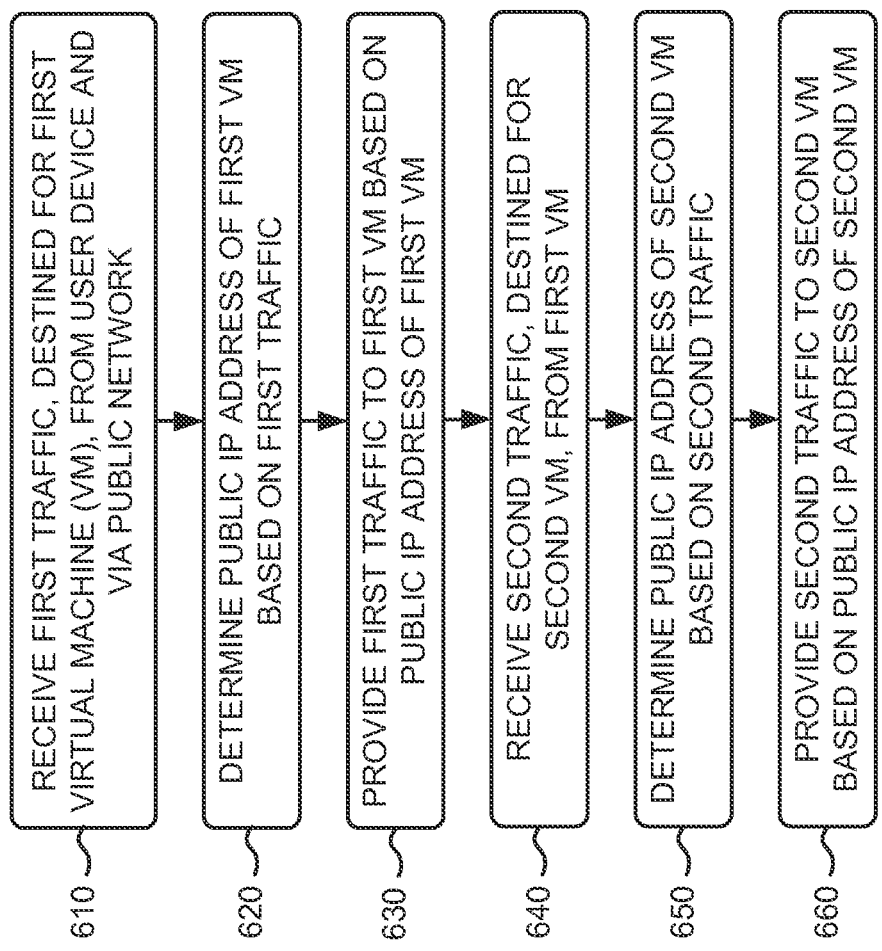

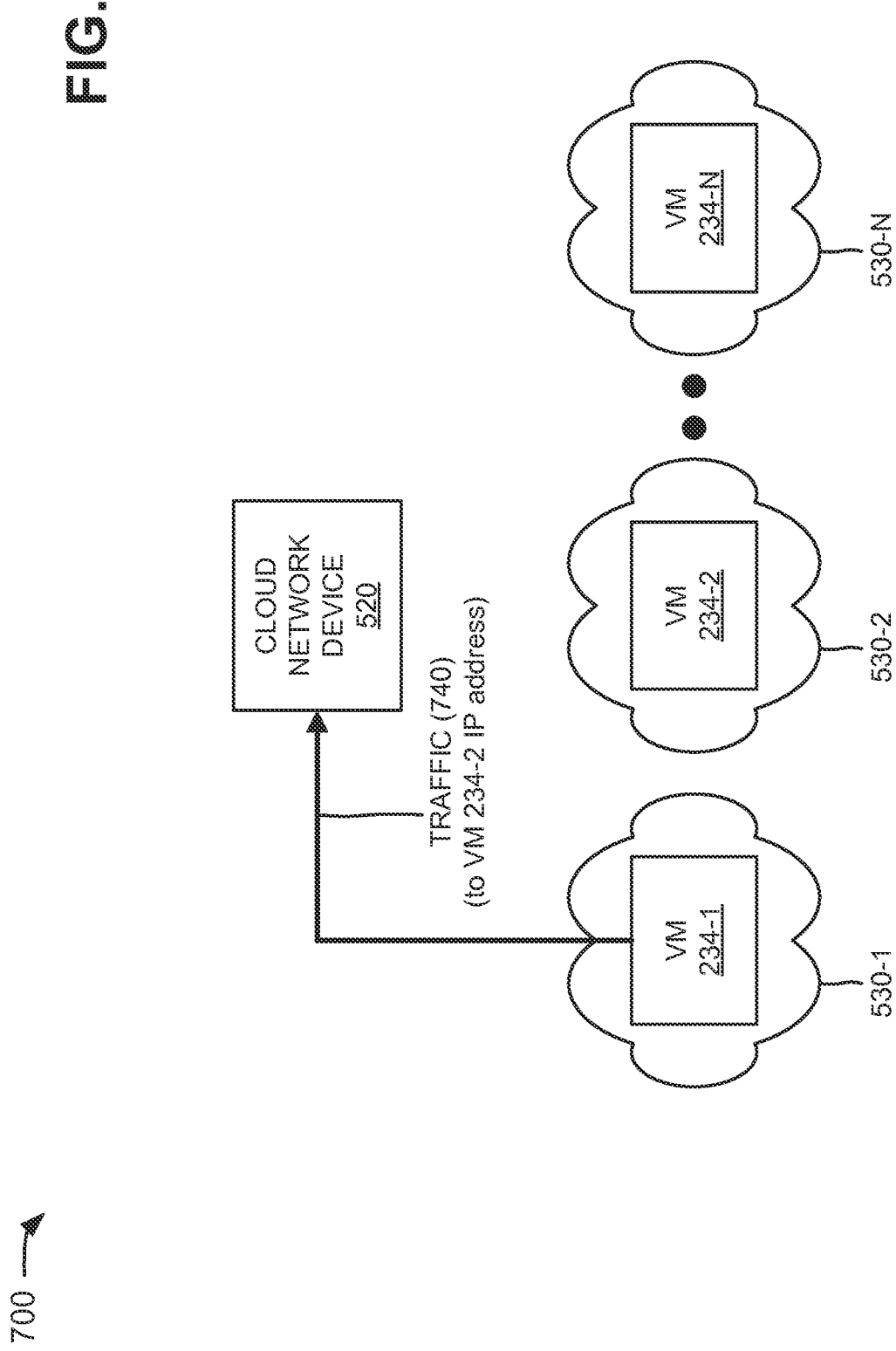

SECURE PUBLIC CONNECTIVITY TO VIRTUAL MACHINES OF A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services.

The computing resources may include virtual machines (VMs) that provide software implementations of a machine and execute programs like a physical machine. The VMs may provide cloud computing services to the users. In conventional arrangements, when a cloud device (e.g., a network device) receives traffic (e.g., packets) with a public Internet protocol (IP) address, network address translation (NAT) is performed on the traffic before the traffic is sent to a destination (e.g., a VM). NAT is the process of modifying IP address information in packet headers while the packet is in transit across a traffic routing device. However, when NAT is performed, the packet may be transformed into a state that does not work well with network protocols.

BRIEF DESCRIPTION OF THE DRAWINGS

FIGS. 1A and 1B are diagrams of an overview of example implementations described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for assigning public IP addresses in a cloud computing environment;

FIGS. 5A and 5B are diagrams of an example of the process described in connection with FIG. 4;

FIG. 6 is a flow chart of an example process for publicly communicating with virtual machines in a cloud computing environment; and FIGS. 7A-7F are diagrams of an example of the process described in connection with FIG. 6.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a cloud network device to receive a packet with a public IP address, and to provide the packet to a VM in a cloud computing environment without performing NAT. The cloud network device may span multiple Layer 2 (e.g., a data link layer) networks, and may be assigned to a single public IP address. Each of the multiple Layer 2 networks may be associated with a corresponding VM. Each VM may be assigned to a separate, different public IP address. A user of a particular VM may communicate with the particular VM through the public IP address associated with the particular VM. The VMs may communicate with each other as though they are directly connected, but such communications may be routed through the cloud network device.

Figure 1B:
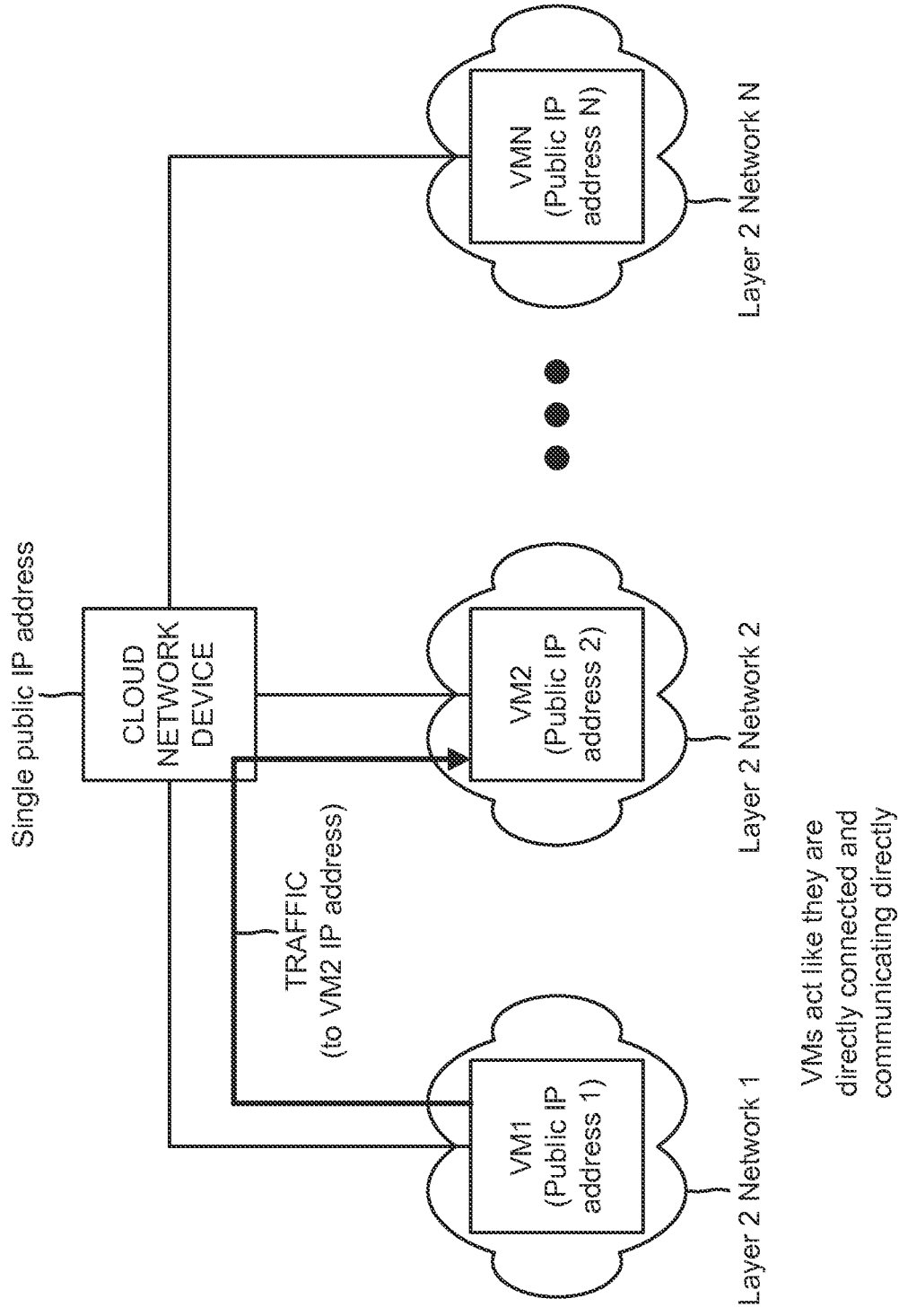

FIGS. 1A and 1B are diagrams of an overview of example implementations described herein. For the overview, assume that a cloud computing environment includes multiple virtual machines (VMs) connected by a cloud network device, as shown in FIG. 1A. The cloud network device may include a router, a switch, a gateway, and/or other devices that process and/or transfer traffic (e.g., packets). Further assume that each VM is associated with a network (e.g., a Layer 2 network). For example, a first VM (e.g., VM1) may be associated with a first network (e.g., Layer 2 network 1), a second VM (e.g., VM2) may be associated with a second network (e.g., Layer 2 network 2), etc.

The cloud computing environment may receive a block of public IP addresses from a public network (e.g., an Internet service provider). The cloud computing environment may assign a single public IP address, of the block of public IP addresses, to the cloud network device. The cloud computing environment may assign a remaining public IP address, of the block of public IP addresses, to each of the VMs. For example, the first VM may be assigned a first public IP address (e.g., public IP address 1), the second VM may be assigned a second public IP address (e.g., public IP address 2), etc.

Further assume that that a user of the cloud computing environment utilizes a user device (e.g., a desktop computer, a tablet computer, etc.) to interact with a service, resource, etc. provided by the first VM. For example, the user device may generate traffic (e.g., packets) destined for the first public IP address (e.g., public IP address 1) of the first VM. The user device may provide the traffic to a public network (e.g., the Internet), and the public network may provide the traffic to the cloud network device. The cloud network device may receive the traffic, and may determine the public IP address of the first VM based on the traffic. The cloud network device may provide the traffic to the first VM based on the public IP address of the first VM (e.g., public IP address 1), as further shown in FIG. 1A.

With reference to FIG. 1B, further assume that the first VM wants to communicate traffic (e.g., packets) with the second VM. The first VM may generate traffic destined for the second public IP address (e.g., public IP address 2) of the second VM. The first VM may know the second public IP address of the second VM, and thus, may believe that the first VM and the second VM are directly connected and can communicate directly. However, the first VM may provide the traffic to the second VM via the cloud network device, as shown in FIG. 1B. The cloud network device may receive the traffic, and may determine the public IP address of the second VM based on the traffic. The cloud network device may provide the traffic to the second VM based on the public IP address of the second VM (e.g., public IP address 2), as further shown in FIG. 1B.

Such an arrangement may enable the user device to publicly connect to a VM in the cloud computing environment, without performing NAT. Without NAT, the user device may have access to the public IP address of the VM associated with a user of the user device. The cloud network device may provide security for the VMs of the cloud computing environment by permitting the user device with access to only the VMs associated with the user (e.g., VMs to which the user has subscribed). The arrangement may also enable the VMs to communicate with each other as though the VMs are directly connected to one another.

FIG. 2 is a diagram of an example environment 200 in which systems and/or methods described herein may be implemented. As illustrated, environment 200 may include a user device 210 interconnected with a cloud computing environment 220 via a network 240. Components of environment 200 may interconnect via wired connections, wireless connections, or a combination of wired and wireless connections.

User device 210 may include one or more devices that are capable of communicating with cloud computing environment 220 via network 240. For example, user device 210 may include a laptop computer, a personal computer, a tablet computer, a desktop computer, a workstation computer, a smart phone, a personal digital assistant (PDA), and/or other computation and communication devices. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as computing resources 230 and individually as computing resource 230). Computing resource 230 may include one or more personal computers, workstation computers, server devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VSs) 236, one or more hypervisors (HYPs) 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of cloud computing environment 220, such as data management, synchronization, and long-duration data transfers.

Virtualized storage 236 may include one or more storage systems and/or one or more devices that use virtualization techniques to enable better functionality and more advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

Network 240 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, application-specific integrated circuits (ASICs), field-programmable gate arrays (FPGAs), or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

FIG. 4 is a flow chart of an example process 400 for assigning public IP addresses in a cloud computing environment. In some implementations, process 400 may be performed by computing resource 230. In some implementations, process 400 may be performed by another device or a group of devices separate from or including computing resource 230.

As shown in FIG. 4, process 400 may include receiving a block of public Internet protocol (IP) addresses (block 410). For example, one of computing resources 230 may function as a cloud management device that manages computing resources 230 of cloud computing environment 220. Each computing resource 230 may connect with other computing resources 230 via one or more cloud network devices. The cloud network devices may include routers, switches, gateways, and/or other devices that process and/or transfer traffic (e.g., packets) between computing resources 230. In some implementations, the cloud management device may receive a block or a number of public IP addresses from a public network entity, such as an Internet service provider. The block of public IP addresses may include IP version 4 (IPv4) addresses (e.g., in dot-decimal notation, such as 192.16.0.0); IP version 6 (IPv6) addresses (e.g., in hexadecimal notation, such as 2001:0DBB:AC10:FE01); etc.

As further shown in FIG. 4, process 400 may include assigning one public IP address of the block to a network device of a cloud computing environment (block 420). For example, the cloud management device may assign one public IP address, of the block of public IP addresses, to a particular cloud network device of cloud computing environment 220. In some implementations, the cloud management device may assign the first public IP address, of the block of public IP addresses, to the particular cloud network device. In some implementations, the particular cloud network device may connect to one or more virtual machines 234 provided in one or more computing resources 230.

Returning to FIG. 4, process 400 may include assigning the remaining public IP addresses of the block to corresponding virtual machines of the cloud computing environment (block 430). For example, the cloud management device may assign one or more remaining public IP addresses, of the block of public IP addresses, to the one or more virtual machines 234 connected to the particular cloud network device. In some implementations, the cloud management device may assign the second public IP address, of the block, to a first virtual machine 234 connected to the particular cloud network device, may assign the third public IP address, of the block, to a second virtual machine 234 connected to the particular cloud network device, etc. A public IP address assigned to a particular virtual machine 234 may be visible to a particular user device 210 associated with the particular virtual machine 234. The particular user device 210 may connect to the particular virtual machine 234 via a public network (e.g., network 240) and the particular cloud network device.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

FIGS. 5A and 5B are diagrams of an example 500 of the process described above with respect to FIG. 4. In example 500, assume that cloud computing environment 220 includes a cloud management device 510 and a cloud network device 520, as shown in FIG. 5A. In some implementations, cloud management device 510 may include one or more computing resources 230 or one or more computation and communication devices separate from computing resources 230. Cloud management device 510 may manage computing resources 230 provided in cloud computing environment 220. Cloud network device 520 may include a traffic transfer device, such as a gateway, a router, a switch, a firewall, a NIC, a hub, a bridge, a proxy server, an OADM, or some other type of device that processes and/or transfers traffic (e.g., packets). In some implementations, cloud network device 520 may include one or more computing resources 230 or one or more computation and communication devices separate from computing resources 230.

As further shown in FIG. 5A, cloud network device 520 may connect to one or more virtual machines 234-1, 234-2, . . . , 234-N provided in one or more computing resources 230 (not shown in FIG. 5A). Each virtual machine 234 connected to cloud network device 520 may form a network, such as a Layer 2 network. For example, virtual machine 234-1 may form a first Layer 2 network 530-1, virtual machine 234-2 may form a second Layer 2 network 530-2, . . . , and virtual machine 234-N may form an Nth Layer 2 network 530-N. In some implementations, cloud network device 520 may be included within each Layer 2 network 530. As further shown in FIG. 5A, cloud management device 510 may receive a block 540 of public IP addresses from a public network entity, such as an Internet service provider associated with network 240 (FIG. 2). For example, block 540 of public IP addresses may include IPv4 addresses, such as 192.16.0.0 through 192.16.255.255.

As shown in FIG. 5B, cloud management device 510 may assign a first public IP address 550 (e.g., 192.16.0.0), of block 540 of public IP addresses, to cloud network device 520. Cloud management device 510 may assign a first remaining public IP address 560-1 (e.g., 192.16.0.1), of block 540 of public IP addresses, to the first virtual machine 234-1. Cloud management device 510 may assign a second remaining public IP address 560-2 (e.g., 192.16.0.2), of block 540 of public IP addresses, to the second virtual machine 234-2. Cloud management device 510 may assign the remaining public IP addresses, of block 540 of public IP addresses, to the remaining virtual machines 234 connected to cloud network device 520. For example, cloud management device 510 may assign an Nth remaining public IP address 560-N (e.g., 192.16.255.255), of block 540 of public IP addresses, to the Nth virtual machine 234-N. In some implementations, user devices 210 assigned to virtual machines 234-1, 234-2, . . . , 234-N may have public access to public IP addresses 560-1, 560-2, . . . 560-N associated with virtual machines 234-1, 234-2, . . . , 234-N, without a need for performing NAT.

In some implementations, each virtual machine 234-1, 234-2, . . . , 234-N may be assigned a separate public IP address, of block 540, for security purposes. For example, since the public IP addresses are reachable from a public network (e.g., network 240), assigning separate public IP addresses to virtual machines 234-1, 234-2, . . . , 234-N may provide isolation to prevent spoofing. Assume that user device 210 is associated with the first virtual machine 234-1 and the first Layer 2 network 530-1. The public IP address assigned to the first virtual machine 234-1 and the first Layer 2 network 530-1 may isolate traffic provided between user device 210 and the first virtual machine 234-1 so that other virtual machines 234-N may not spoof the first virtual machine 234-1 and communicate with user device 210.

In some implementations, cloud management device 510 may receive other blocks of public IP addresses, and may assign each block of public IP addresses to other cloud network devices 520 and virtual machines 234 connected to the other cloud network devices 520. The other cloud network devices 520 and virtual machines 234 connected to the other cloud network devices 520 may include the features described above in connection with FIGS. 5A and 5B.

As indicated above, FIGS. 5A and 5B are provided merely as an example. Other examples are possible and may differ from what was described with regard to FIGS. 5A and 5B.

FIG. 6 is a flow chart of an example process 600 for publicly communicating with virtual machines in a cloud computing environment. In some implementations, process 600 may be performed by computing resource 230. In some implementations, process 600 may be performed by another device or a group of devices (e.g., cloud network device 520) separate from or including computing resource 230.

As shown in FIG. 6, process 600 may include receiving first traffic, destined for a first virtual machine (VM), from a user device and via a public network (block 610). For example, a user of cloud computing environment 220 may utilize user device 210 to interact with a service, resource, etc. provided by the first virtual machine 234-1 (FIG. 5A). For example, user device 210 may generate traffic (e.g., packets) destined for the first remaining public IP address 560-1 (FIG. 5B) of the first virtual machine 234-1. User device 210 may provide the traffic to network 240, and network 240 may provide the traffic to cloud network device 520 (FIGS. 5A and 5B). Cloud network device 520 may receive the traffic from network 240.

As further shown in FIG. 6, process 600 may include determining a public IP address of the first VM based on the first traffic (block 620). For example, cloud network device 520 may read information provided in the packets of the traffic to determine a destination of the traffic. In some implementations, cloud network device 520 may read packet headers of the traffic to determine the destination of the traffic. The packet headers may include a public IP address (e.g., the first remaining public IP address 560-1) associated with the first virtual machine 234-1. Thus, cloud network device 520 may determine that the destination of the traffic is the first remaining public IP address 560-1 associated with the first virtual machine 234-1.

Returning to FIG. 6, process 600 may include providing the first traffic to the first VM based on the public IP address of the first VM (block 630). For example, cloud network device 520 may provide the traffic to the first virtual machine 234-1 based on the first remaining public IP address 560-1 associated with the first virtual machine 234-1. The first virtual machine 234-1 may receive the traffic, and may process the traffic. For example, if user device 210 requests a service via the traffic, the first virtual machine 234-1 may provide the service requested by user device 210.

As further shown in FIG. 6, process 600 may include receiving second traffic, destined for a second VM, from the first VM (block 640). For example, the first virtual machine 234-1 may need to interact with a service, resource, etc. provided by the second virtual machine 234-2 (FIG. 5A). The first virtual machine 234-1 may know the public IP address (e.g., the second remaining public IP address 560-2) of the second virtual machine 234-2 since the first virtual machine 234-1 and the second virtual machine 234-2 are both connected to cloud network device 520. The first virtual machine 234-1 may generate traffic (e.g., packets) destined for the second remaining public IP address 560-2 (FIG. 5B) of the second virtual machine 234-2. The first virtual machine 234-1 may provide the traffic to cloud network device 520, and cloud network device 520 may receive the traffic from the first virtual machine 234-1.

Returning to FIG. 6, process 600 may include determining a public IP address of the second VM based on the second traffic (block 650). For example, cloud network device 520 may read information provided in the packets of the traffic to determine a destination of the traffic. In some implementations, cloud network device 520 may read packet headers of the traffic to determine the destination of the traffic. The packet headers may include a public IP address (e.g., the second remaining public IP address 560-2) associated with the second virtual machine 234-2. Thus, cloud network device 520 may determine that the destination of the traffic is the second remaining public IP address 560-2 associated with the second virtual machine 234-2.

As further shown in FIG. 6, process 600 may include providing the second traffic to the second VM based on the public IP address of the second VM (block 660). For example, cloud network device 520 may provide the traffic to the second virtual machine 234-2 based on the second remaining public IP address 560-2 associated with the second virtual machine 234-2. The second virtual machine 234-2 may receive the traffic, and may process the traffic. For example, if the first virtual machine 234-1 requests performance of a function via the traffic, the second virtual machine 234-2 may perform the function and may provide results of the performance of the function to the first virtual machine 234-1.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
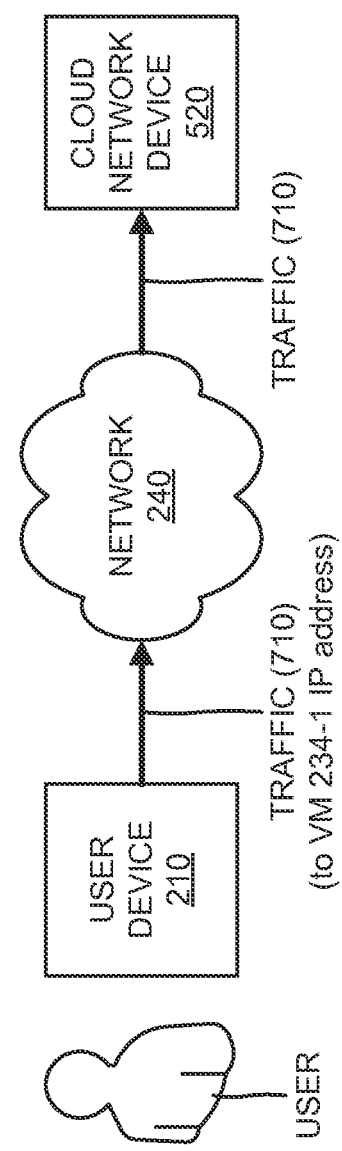

FIGS. 7A-7F are diagrams of an example 700 of the process described above with respect to FIG. 6. In example 700, assume that a user associated with user device 210 wishes to receive or interact with a service, resource, etc. provided by the first virtual machine 234-1 (FIG. 5A). In order to receive a service, resource, etc. provided by the first virtual machine 234-1, user device may generate traffic 710 destined for the public IP address (e.g., the first remaining public IP address 560-1) associated with the first virtual machine 234-1, as shown in FIG. 7A. In some implementations, traffic 710 may include a request to perform a service, a request to utilize a resource, etc. associated with the first virtual machine 234-1. As further shown in FIG. 7A, user device 210 may provide traffic 710 to network 240, and network 240 may forward traffic 710 to cloud network device 520 associated with the first virtual machine 234-1. Cloud network device 520 may receive traffic 710 and/or may store traffic 710.

Figure 7B:
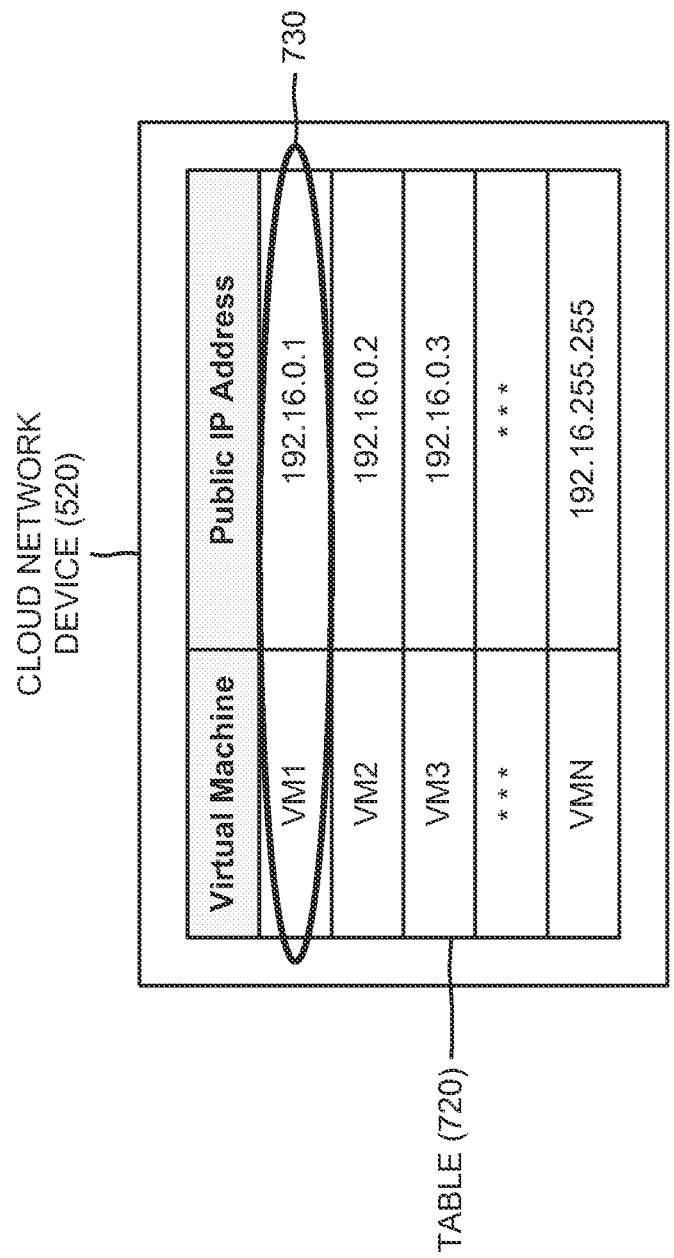

Cloud network device 520 may read information provided in the packets of traffic 710 to determine a destination of traffic 710. In some implementations, cloud network device 520 may read packet headers of traffic 710 to determine the destination of traffic 710. The packet headers may include a public IP address (e.g., the first remaining public IP address 560-1) associated with the first virtual machine 234-1. In some implementations, and as shown in FIG. 7B, cloud network device 520 may include a table 720 that matches identifiers for virtual machines 234 (e.g., VM1, VM2, etc.) with public IP addresses assigned to virtual machines 234. For example, if traffic 710 includes information identifying the first virtual machine 234-1 (e.g., VM1), cloud network device 520 may utilize table 720 to determine the public IP address (e.g., 192.16.0.1) for the first virtual machine 234-1, as indicated by reference number 730.

Figure 7C:
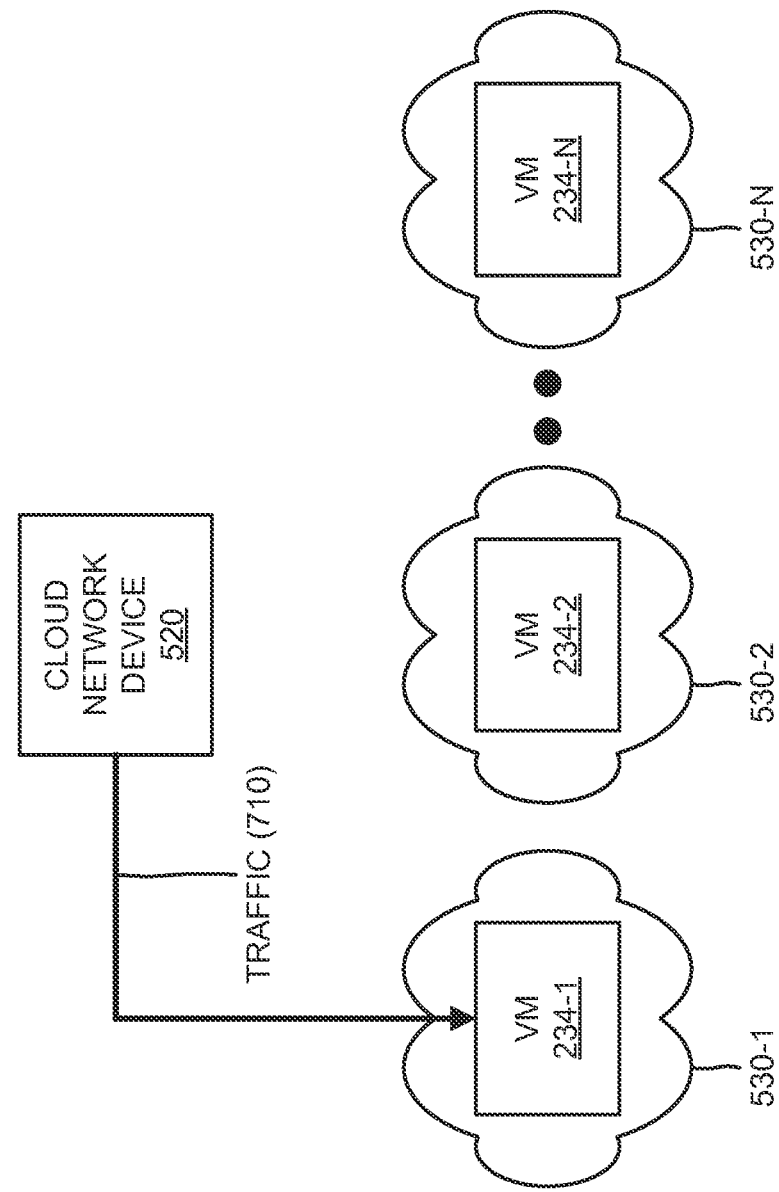

As shown in FIG. 7C, cloud network device 520 may provide traffic 710 to the first virtual machine 234-1 based on the public IP address (e.g., 192.16.0.1) associated with the first virtual machine 234-1. The first virtual machine 234-1 may receive traffic 710, and may process traffic 710. For example, if user device 210 requests performance of a function via traffic 710, the first virtual machine 234-1 may perform the function requested by user device 210, and may return results of the performance of the function to user device 210.

Since the first virtual machine 234-1 is connected to the second virtual machine 234-2 via cloud network device 520, the first virtual machine 234-1 and the second virtual machine 234-2 may function as though they are directly connected to one another. For example, the first virtual machine 234-1 may think that it may directly communicate with the second virtual machine 234-2. In example 700, assume that the first virtual machine 234-1 needs to interact with a service, resource, etc. provided by the second virtual machine 234-2. For example, assume that the second virtual machine 234-2 needs to authenticate user device 210 before the first virtual machine 234-1 may respond to traffic 710. The first virtual machine 234-1 may know the public IP address (e.g., the second remaining public IP address 560-2) of the second virtual machine 234-2 since the first virtual machine 234-1 and the second virtual machine 234-2 are both connected to cloud network device 520. The first virtual machine 234-1 may generate traffic 740 (e.g., packets) destined for the second remaining public IP address 560-2 of the second virtual machine 234-2, as shown in FIG. 7D. The first virtual machine 234-1 may provide traffic 740 to cloud network device 520, and cloud network device 520 may receive traffic 740 from the first virtual machine 234-1.

Figure 7E:
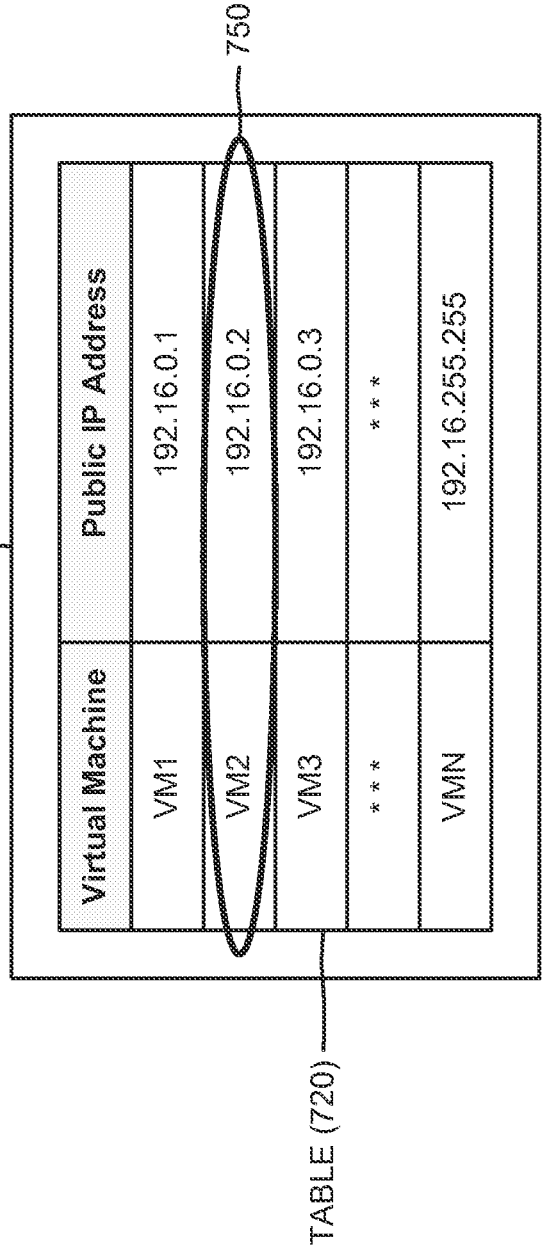

Cloud network device 520 may read information provided in the packets of traffic 740 to determine a destination of traffic 740. In some implementations, cloud network device 520 may read packet headers of traffic 740 to determine the destination of traffic 740. The packet headers may include a public IP address (e.g., the second remaining public IP address 560-2) associated with the second virtual machine 234-2. In some implementations, and as shown in FIG. 7E, if traffic 740 includes information identifying the second virtual machine 234-2 (e.g., VM2), cloud network device 520 may utilize table 720 to determine the public IP address (e.g., 192.16.0.2) for the second virtual machine 234-2, as indicated by reference number 750.

Figure 7F:
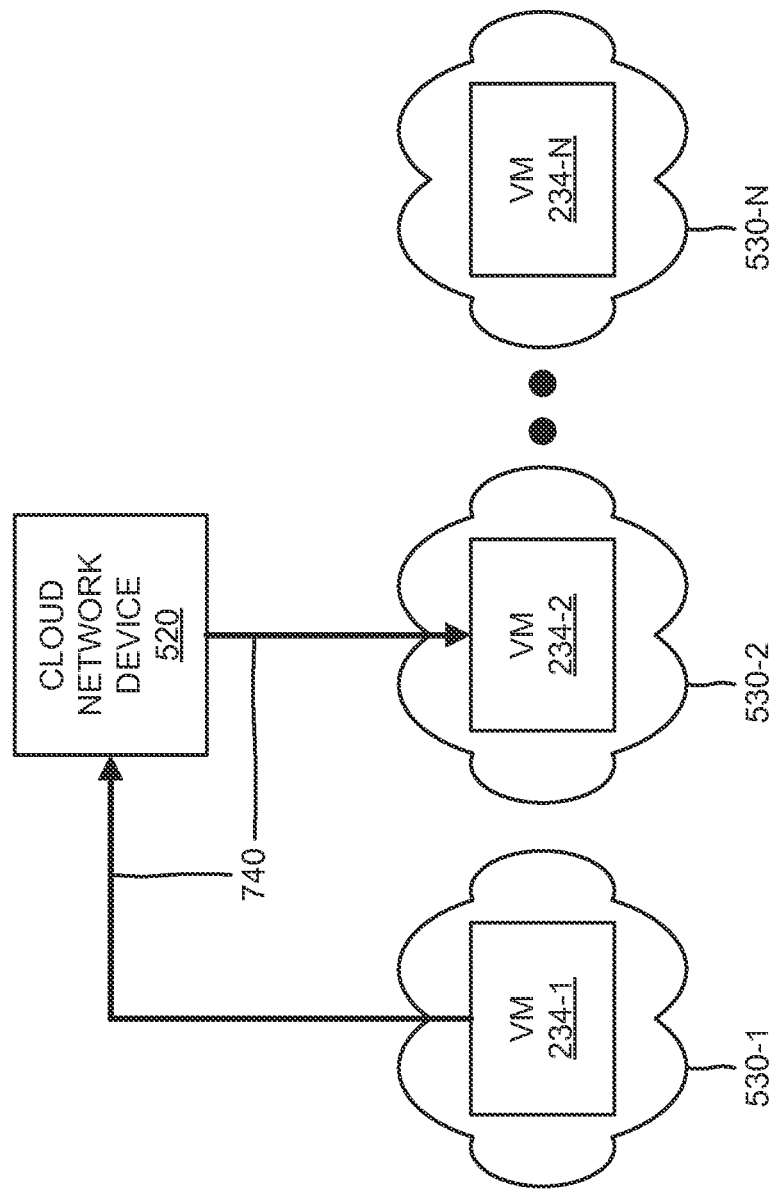

As shown in FIG. 7F, cloud network device 520 may provide traffic 740 to the second virtual machine 234-2 based on the public IP address (e.g., 192.16.0.2) associated with the second virtual machine 234-2. The second virtual machine 234-2 may receive traffic 740, and may process traffic 740. For example, the second virtual machine 234-2 may authenticate user device 210, based on traffic 740, and may provide results of the authentication to the first virtual machine 234-1. The first virtual machine 234-1 may or may not respond to traffic 710 based on the results of the authentication of user device 210. For example, if user device 210 is not authenticated by the second virtual machine 234-2, the first virtual machine 234-1 may not respond to traffic 710.

As indicated above, FIGS. 7A-7F are provided merely as an example. Other examples are possible and may differ from what was described with regard to FIGS. 7A-7F.

Systems and/or methods described herein may enable a cloud network device to receive a packet with a public IP address, and to provide the packet to a VM in a cloud computing environment without performing NAT. The cloud network device may span multiple Layer 2 networks, and may be assigned to a single public IP address. Each of the multiple Layer 2 networks may be associated with a corresponding VM. Each VM may be assigned to a separate, different public IP address. A user of a particular VM may communicate with the particular VM through the public IP address associated with the particular VM. The VMs may communicate with each other as though they are directly connected, but such communications may be routed through the cloud network device.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

As used herein, the term "user" is intended to be broadly interpreted to include a user device, or a user of a user device.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a network device of a cloud computing environment, a first packet destined for a first virtual machine of a plurality of virtual machines of the cloud computing environment,
      the first packet being received:
         from a user device, and
         via a public network,
      the network device being associated with a plurality of data link layer networks,
         each one of the plurality of data link layer networks being associated with a corresponding one of the plurality of virtual machines,
      the network device being associated with a first public Internet Protocol (IP) address,
      the first virtual machine being associated with a second public IP address,
         the second public IP address being different than the first public IP address,
      prior to receiving the first packet, the user device:
         being subscribed to the first virtual machine,
         being granted access to the second public IP address based on the user device being subscribed to the first virtual machine, and
         including the second public IP address in the first packet based on being granted access to the second public IP address, and
      the plurality of virtual machines, in the cloud computing environment, being associated with separate public IP addresses to provide isolation for the plurality of virtual machines and to prevent spoofing by one or more of the plurality of virtual machines,
      all of the plurality of virtual machines in the cloud computing environment being assigned public IP addresses, and
      the network device including a table,
         the network device using the table to match identifiers for the plurality of virtual machines to the public IP addresses assigned to the plurality of virtual machines;
   determining, by the network device, the second public IP address associated with the first virtual machine,
      the second public IP address being determined:
         based on the first packet, and
         without performing network address translation on the first packet;
   providing, by the network device, the first packet to the first virtual machine based on the second public IP address associated with the first virtual machine,
      the first virtual machine determining, based on the first packet, that the user device is to be authenticated by a second virtual machine, of the plurality of virtual machines,
         the second virtual machine being associated with a third public IP address, the first virtual machine generating a second packet destined for the third public IP address,
      the second packet including information requesting authentication of the user device, and
      the first virtual machine knowing the third public IP address of the second virtual machine;
   receiving, by the network device, the second packet from the first virtual machine;
   determining, by the network device, the third public IP address associated with the second virtual machine,
      the third public IP address being determined:
         based on the second packet, and
         without performing network address translation on the second packet; and
   providing, by the network device, the second packet to the second virtual machine based on the third public IP address associated with the second virtual machine,
      the second virtual machine generating an authentication result based on the second packet, and
      the first virtual machine processing the first packet based on the authentication result.

2. The method of claim 1, where:
   the first public IP address is assigned to the network device from a plurality of public IP addresses;
   the second public IP address is assigned to the first virtual machine from the plurality of public IP addresses; and
   the third public IP address is assigned to the second virtual machine from the plurality of public IP addresses.

3. The method of claim 1, where the third public IP address is different than the first public IP address and the second public IP address.

4. The method of claim 1, where the second virtual machine receives and processes the second packet.

5. The method of claim 1, further comprising:
performing a comparison of information in the first packet with information in the table provided in the network device; and
determining the second public IP address associated with the first virtual machine based on the comparison of the information in the first packet with the information in the table.

6. The method of claim 1, further comprising:
performing a comparison of information in the second packet with information in the table provided in the network device; and
determining the third public IP address associated with the second virtual machine based on the comparison of the information in the second packet with the information in the table.

7. The method of claim 1, where the second virtual machine authenticates the user device based on the second packet.

8. A network device of a cloud computing environment, the network device comprising:
one or more processors to:
receive a first packet destined for a first virtual machine of a plurality of virtual machines of the cloud computing environment,
the first packet being received:
from a user device, and
via a public network,
the network device being associated with a plurality of data link layer networks,
each one of the plurality of data link layer networks being associated with a corresponding one of the plurality of virtual machines,
the network device being associated with a first public Internet Protocol (IP) address,
the first virtual machine being associated with a second public IP address that is different than the first public IP address,
prior to receiving the first packet, the user device:
being subscribed to the first virtual machine,
being granted access to the second public IP address based on the user device being subscribed to the first virtual machine, and
including the second public IP address in the first packet based on being granted access to the second public IP address, and
the plurality of virtual machines being associated with separate public IP addresses to provide isolation for the plurality of virtual machines and to prevent spoofing by one or more of the plurality of virtual machines,
all of the plurality of virtual machines in the cloud computing environment being assigned public IP addresses, and
the network device including a table,
the network device using the table to match identifiers for the plurality of virtual machines to the public IP addresses assigned to the plurality of virtual machines;
determine, based on the first packet, the second public IP address associated with the first virtual machine,
the second public IP address being determined without performing network address translation on the first packet;
provide the first packet to the first virtual machine based on the second public IP address associated with the first virtual machine,
the first virtual machine determining, based on the first packet, that the user device is to be authenticated by a second virtual machine, of the plurality of virtual machines,
the second virtual machine being associated with a third public IP address,
the first virtual machine generating a second packet destined for the third public IP address,
the second packet including information requesting authentication of the user device, and
the first virtual machine knowing the third public IP address of the second virtual machine;
receive the second packet from the first virtual machine;
determine the third public IP address associated with the second virtual machine,
the third public IP address being determined:
based on the second packet; and
without performing network address translation on the second packet; and
provide the second packet to the second virtual machine based on the third public IP address associated with the second virtual machine,
the second virtual machine generating an authentication result based on the second packet, and
the first virtual machine processing the first packet based on the authentication result.

9. The network device of claim 8, where:
the first public IP address is assigned to the network device from a plurality of public IP addresses;
the second public IP address is assigned to the first virtual machine from the plurality of public IP addresses; and
the third public IP address is assigned to the second virtual machine from the plurality of public IP addresses.

10. The network device of claim 8, where the one or more processors are further to:
perform a comparison of information in the first packet with information in the table provided in the network device; and
determine the second public IP address associated with the first virtual machine based on the comparison of the information in the first packet with the information in the table.

11. The network device of claim 8, where the third public IP address is different than the first public IP address and the second public IP address.

12. The network device of claim 8, where the one or more processors are further to:
perform a comparison of information in the second packet with information in the table provided in the network device; and
determine the third public IP address associated with the second virtual machine based on the comparison of the information in the second packet with the information in the table.

13. The network device of claim 8, where the second virtual machine authenticates the user device based on the second packet.

14. The network device of claim 8, where the first virtual machine is associated with a first data link layer network, of the plurality of data link layer networks, and the second virtual machine is associated with a second data link layer network, of the plurality of data link layer networks, that is different than the first data link layer network.

15. A non-transitory computer-readable medium for storing instructions, the instructions comprising:

one or more instructions that, when executed by a processor of a network device of a cloud computing environment, cause the processor to:
receive a first packet destined for a first virtual machine of a plurality of virtual machines of the cloud computing environment,
the first packet being received:
from a user device, and
via a public network,
the network device being associated with a plurality of data link layer networks,
each one of the plurality of data link layer networks being associated with a corresponding one of the plurality of virtual machines, the network device being associated with a first public Internet Protocol (IP) address,
the first virtual machine being associated with a second public IP address that is different than the first public IP address,
prior to receiving the first packet, the user device:
being subscribed to the first virtual machine,
being granted access to the second public IP address based on the user device being subscribed to the first virtual machine, and
including the second public IP address in the first packet based on being granted access to the second public IP address, and
the plurality of virtual machines being associated with separate public IP addresses to provide isolation for the plurality of virtual machines and to prevent spoofing by one or more of the plurality of virtual machines,
all of the plurality of virtual machines in the cloud computing environment being assigned public IP addresses, and
the network device including a table,
the network device using the table to match identifiers for the plurality of virtual machines to the public IP addresses assigned to the plurality of virtual machines;
determine, based on the first packet, the second public IP address associated with the first virtual machine,
the second public IP address being determined without performing network address translation on the first packet,
provide the first packet to the first virtual machine based on the second public IP address associated with the first virtual machine,
the first virtual machine determining, based on the first packet, that the user device is to be authenticated by a second virtual machine, of the plurality of virtual machines,
the second virtual machine being associated with a third public IP address,
the first virtual machine generating a second packet destined for the third public IP address,
the second packet including information requesting authentication of the user device, and
the first virtual machine knowing the third public IP address of the second virtual machine;
receive the second packet from the first virtual machine,
determine the third public IP address associated with the second virtual machine,
the third public IP address being determined:
based on the second packet, and
without performing network address translation on the second packet; and
provide the second packet to the second virtual machine based on the third public IP address associated with the second virtual machine,
the second virtual machine generating an authentication result based on the second packet, and
the first virtual machine processing the first packet based on the authentication result.

16. The non-transitory computer-readable medium of claim 15, where the instructions further comprise:
one or more instructions that, when executed by the processor, cause the processor to:
perform a comparison of information in the first packet with information in the table provided in the network device;
and
determine the second public IP address associated with the first virtual machine based on the comparison of the information in the first packet with the information in the table.

17. The non-transitory computer-readable medium of claim 15, where the third public IP address is different than the first public IP address and the second public IP address.

18. The non-transitory computer-readable medium of claim 15, where the instructions further comprise:
one or more instructions that, when executed by the processor, cause the processor to:
perform a comparison of information in the second packet with information in the table provided in the network device; and
determine the third public IP address associated with the second virtual machine based on the comparison of the information in the second packet with the information in the table.

19. The non-transitory computer-readable medium of claim 15, where the first virtual machine is associated with a first data link layer network, of the plurality of data link layer networks, and the second virtual machine is associated with a second data link layer network, of the plurality of data link layer networks, that is different than the first data link layer network.

20. The non-transitory computer-readable medium of claim 15, where the second virtual machine authenticates the user device based on the second packet.

* * * * *